United States Patent
Perrin et al.

(10) Patent No.: US 6,496,494 B1
(45) Date of Patent: Dec. 17, 2002

(54) RECEIVER AND METHOD WITH ENHANCED PERFORMANCE FOR CDMA TRANSMISSION

(75) Inventors: Jean-Hugues Perrin, Argenteuil (FR); Elie Bejjani, Saint-Cloud (FR); Alexandre Da Rocha, Puteaux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/377,032

(22) Filed: Aug. 19, 1999

(30) Foreign Application Priority Data

Jun. 24, 1999 (EP) .......................................... 99440158

(51) Int. Cl.[7] .............................................. H04B 7/216
(52) U.S. Cl. ...................... 370/335; 370/342; 375/140; 375/147
(58) Field of Search ................................ 370/335, 339, 370/342, 334; 375/140, 147, 148, 144, 349; 455/132, 137, 272, 277.1

(56) References Cited

U.S. PATENT DOCUMENTS

| | | | | |
|---|---|---|---|---|
| 5,528,624 A | * | 6/1996 | Kaku et al. | 375/148 |
| 5,886,987 A | * | 3/1999 | Yoshida et al. | 370/318 |
| 6,028,852 A | * | 2/2000 | Miya et al. | 370/335 |
| 6,069,912 A | * | 5/2000 | Sawahashi et al. | 375/142 |
| 6,097,711 A | * | 8/2000 | Okawa et al. | 370/335 |

FOREIGN PATENT DOCUMENTS

| | | |
|---|---|---|
| EP | 0 749 215 A2 | 12/1996 |
| EP | 0 798 870 A2 | 10/1997 |
| EP | 0 836 288 A2 | 4/1998 |

OTHER PUBLICATIONS

Baier, A. et al., "Design Study for a CDMA–Based Third Generation Mobile Radio System", IEEE Journal on Selected Areas in Communications, US, IEEE Inc., New York, vol. 12, No. 4, May 1994, pp. 733–743.*

Baier, A. et al.: "Design Study for a CDMA–Based Third Generation Mobile Radio System" IEEE Journal of Selected Areas in Communications, US, IEEE INC, New York, vol. 12, No. 4, pp. 733–743 XP000588850 ISSN: 0733–8716.

* cited by examiner

Primary Examiner—Nay Maung
Assistant Examiner—Gregory V. Old
(74) Attorney, Agent, or Firm—Sughrue Mion, PLLC

(57) ABSTRACT

Receiver for enhanced performance for CDMA radio transmission comprising roke receiver with a path searcher (3), a channel estimator (4) and a combiner (5) for selecting optimal paths where the path searcher selects a set of path delays (7) with an instantaneous profile analyzer (8), an averaging filter (9) and a path selector (10) where at least two instantaneous profile analyzers (8) are connected to the averaging filter (9).

7 Claims, 6 Drawing Sheets

RECEIVER AND METHOD WITH ENHANCED PERFORMANCE FOR CDMA TRANSMISSION

BACKGROUND OF THE INVENTION

The invention relates to a receiver and a method for enhanced performance for CDMA transmission as described in the subject of the independent claims.

In terrestrial communication the transmitted signal is reflected and refracted by a variety of smooth or rough terrains, so that it is replicated at the receiver with several time delays. Each individual path also arrives at its own amplitude and carrier phase. Propagation characteristics are qualitatively the same for all structures of signals though they will vary quantitatively with carrier frequency and terrain characteristics. The structures of the individual propagation paths can be identified and possibly exploited only to the extent that they can be distinguished from one another. In particular, spread spectrum signals employ pseudo-random sequences with a chip time Tc inversely proportional to the spreading bandwidth. In this case, the individual paths can be distinguished if they are mutually separated by delays greater than Tc, for then the various delayed versions of the signal will be mutually uncorrelated.

The situation is shown in FIG. 1. The path amplitudes ($\alpha$ will depend on the relative propagation distances and the reflective or refractive properties of the area. However, in many cases, particularly in confined areas, each of the distinguishable multipath components will actually be itself the linear combination of several indistinguishable paths of varying amplitudes. To exploit energy in the multiple components of multipath propagation, they must be identified and acquired. It is particularly important to determine the relative delays and subsequently, when possible, their amplitudes and phases. This can be performed even with fully modulated signals, but the estimate is much more precise and the resulting performance is much improved if the path identification and parameter estimation is performed on an unmodulated signal. Unmodulated segments can be inserted every so often in the modulated signal, particularly with time division multiplexing. However, in spread spectrum systems it is much more effective and easier to separate the unmodulated pilot signals from the data modulated signal by assigning it an individual pseudo-random sequence.

A pilot sequence for determining multipath component characteristics is well justified for one-to-many transmission channels such as the forward down link from a base station to multiple users.

The optimum demodulator structure for an L multipath propagation channel is known as Rake receiver. Each multipath component demodulator is called a "finger" of the rake. The pilot sequence tracking of a particular demodulator is started by time delay estimation of a given path as determined by the pilot sequences searcher. The demodulator forms the weighted phase-adjusted and delay-adjusted sum of L components. In the prior art, the profile of the powers of each of the L paths is taken by checking the pilot sequence of one pilot channel on a slot-by-slot basis. This power profile is computed by non-coherent averaging of instantaneous channel profiles on this slot-by-slot basis. So the demodulator has to wait for the next pilot sequence in the next time slot to get more information to optimize the power profile.

For down link mode, the performance of this solution depends extremely on the signal-tonoise ratio of the pilot sequence. This means that the result of the demodulation in the receiver depends on the pilot sequence length itself and on the distortions in the dedicated channel.

Moreover, for high bitrates, the correlation length is shorter because of the lower spreading factor of the signal. Thus, for different bit rates, the performance of the path selection algorithm can be different.

SUMMARY OF THE INVENTION

The invention as described below increases performance of a demodulator in a CDMA receiver due to a method using more than one pilot sequence to extract good information about path delays and so to get an optimized channel profile.

The improvements are done by:

A receiver with enhanced performance for CDMA transmission comprising rake receiver with a path searcher (3), a channel estimator (4) and a combiner (5) for selecting optimal paths where the path searcher selects a set of path delays (7) with an instantaneous profile analyzer (8), an averoging filter (9) and a path selector (10), characterized in that at least two instantaneous profile analyzers (8) are connected to the averoging filter (9)

Or:

A receiver with enhanced performance for CDMA transmission comprising rake receiver with a path searcher (3), a channel estimator (4) and a combiner (5) for selecting optimal paths where the path searcher selects a set of path delays (7) with an instantaneous profile analyzer (8), on averaging filter (9) and a path selector (10), characterized in that at least two probes of pilot sequences are selected by a selection element (12) and are connected to one instantaneous profile analyzer (8) over a P-S converter (11).

BRIEF DESCRIPTION OF THE DRAWINGS

A preferred embodiment of the invention is shown in the figures and describes below FIG. 1 Multipath transmission FIG. 2 Channel structure FIG. 3 Pilot sequences

DETAILED DESCRIPTION OF THE INVENTION

Figure 1:
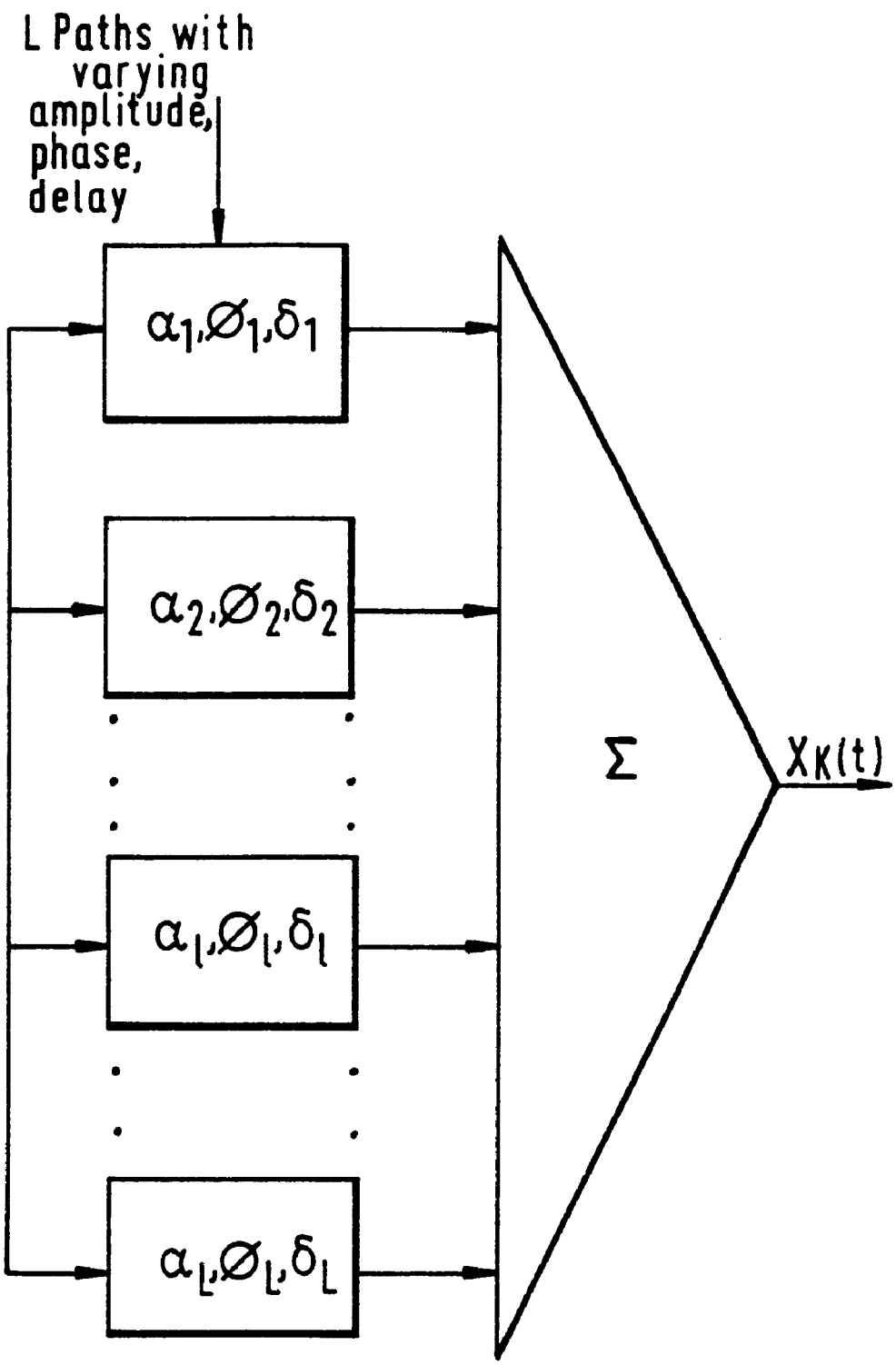
Figure 2:
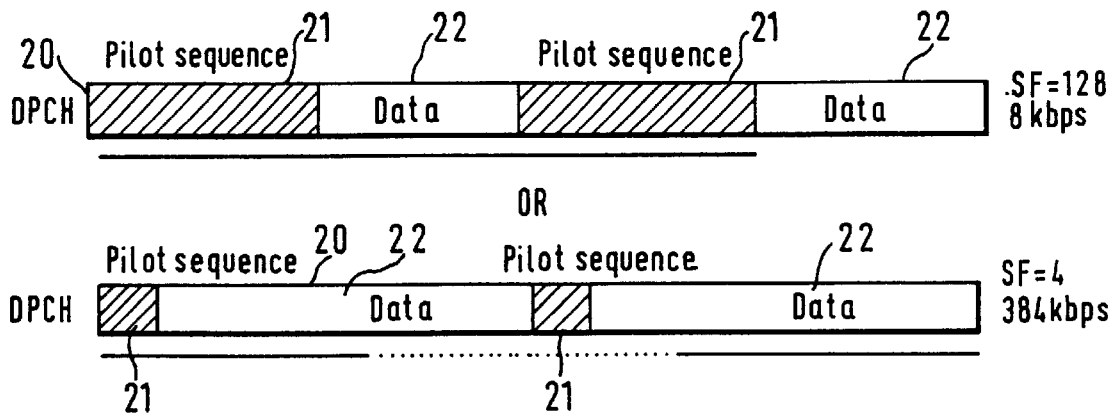

In the prior art, the dedicated physical channel (DPCH) and its pilot sequence is used to extract a power profile of the channels. In FIG. 2, two examples of the DPCH 20 are shown with different spreading factors SF due to different bit rates. A pilot sequence 21 is followed by a data field 22. In the upper example the correlation length is higher than in the example with a higher bit rate.

So the performance of a receiver checking only the pilot sequence of the DPCH depends on the data rate.

Figure 3:
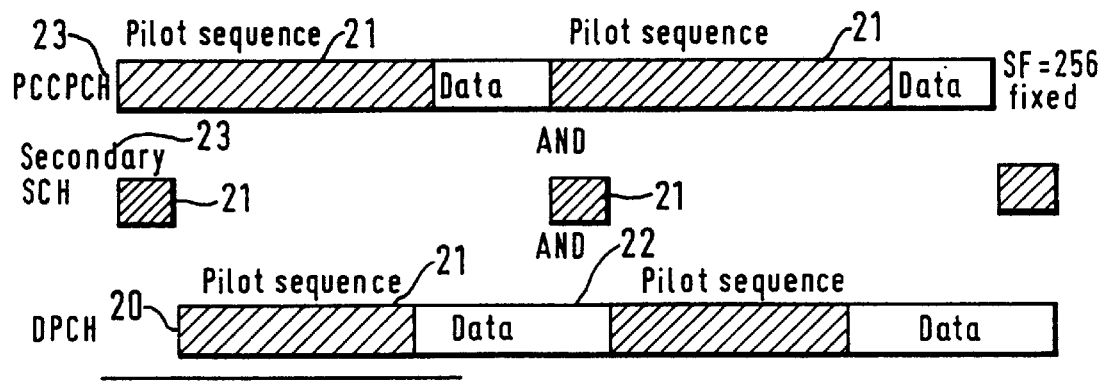

FIG. 3 shows different channels that can be used in our invention. In the UTRA/FOD standard proposal, several common channels 23 are transmitted in parallel on the down link. For example, primary and secondary common control physical channels (PCCPCH and SCCPCH) or SCH (Synchronization Channel) are broadcasted. These channels have a sufficient power to be detected anywhere in the cell and are transmitted with a constant bit rate except of the SCCPCH. The spreading factor is fixed with the bit rate. So to get a more reliable path selection in complement to the prior art, pilot sequences used for common channels can be used to have new additional power profiles of the channel. These new profiles are more reliable because down link common channels are transmitted at a relatively high power to be well detected by all users in the cell. Secondly, most of these channels have a constant and low bit rate, so that pilot sequences are of a long duration. In terms of correlation properties long pilot sequences give more accurate results. This is a benefit in comparison with a power profile extracted from variable bit rate channels. A way to enhance performance is simply to use instantaneous profiles obtained by common channels in addition to those obtained from dedicated channel in the process of noncoherent averaging of channel profiles. In FIG. 3, there is a solution depicted with two common channels 23 in combination with the dedicated channel 20. These three profiles are obtained to get a reliable profile and to reduce the averaging period by combining the results.

Figure 4:
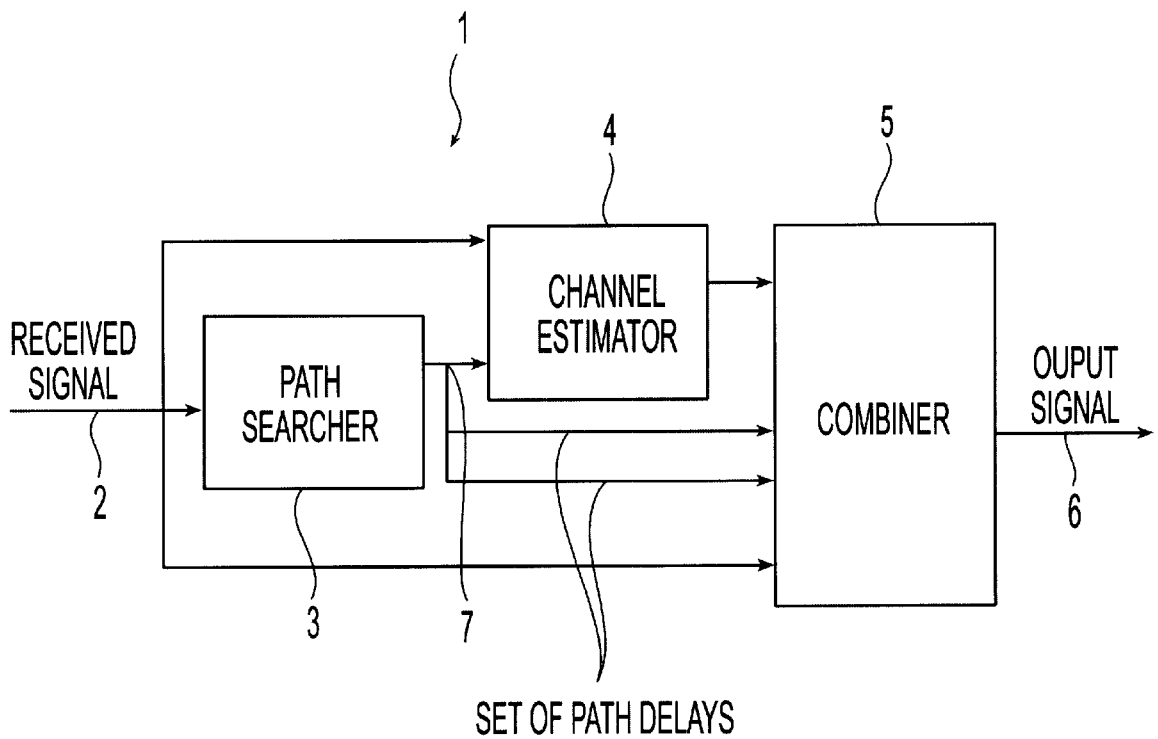
FIG. 4 Receiver

FIG. 4 shows the functional block diagram of a rake receiver. The rake receiver 1 is a fundamental element of the mobile station demodulator. A typical Rake receiver comprises three basic algorithms: a path searcher 3, a channel estimator 4, and a combiner 5. First, from a known pilot sequence 21, the path searcher 3 estimates the number and locations (time delays) 7 of the paths in a frequency selective channel. These delay estimates 7 are then used by the channel estimator 4 to get the complex coefficients Ci of the propagation channel. Finally, the combiner 5 coherently combines the channel coefficient estimates obtained for each path to enhance the useful data signal information before detection.

The principle of the Rake receiver is to combine the maximum number of different paths, by introducing delays in the receiver. These paths and delays ($\tau_i$ is the delay of the $i^{th}$ path) are respectively detected and estimated by the functional block called path searcher 3. The second block of the Rake receiver is the channel estimator 4, which performs the estimation of the channel impulse response over all the detected paths by the path searcher 3. These estimations are also used to combine coherently each received path. This combination of the paths is performed by the combiner 5.

The poth-searcher algorithm is an important functional port in a Rake receiver. The aim of this algorithm is to estimate the number and the location of the paths in a multipath channel. These estimations are also used by the channel estimator 4 and the combiner. Those are connected to the paih searcher 3.

To detect paths, the path searcher 3 uses the pilot sequence 21 of the Dedicated Physical Channel 20. This pilot sequence is split on I&Q branches, spread with a Hadomard code and scrambled with a Gold code, according to the ETSI specification.

Figure 5:
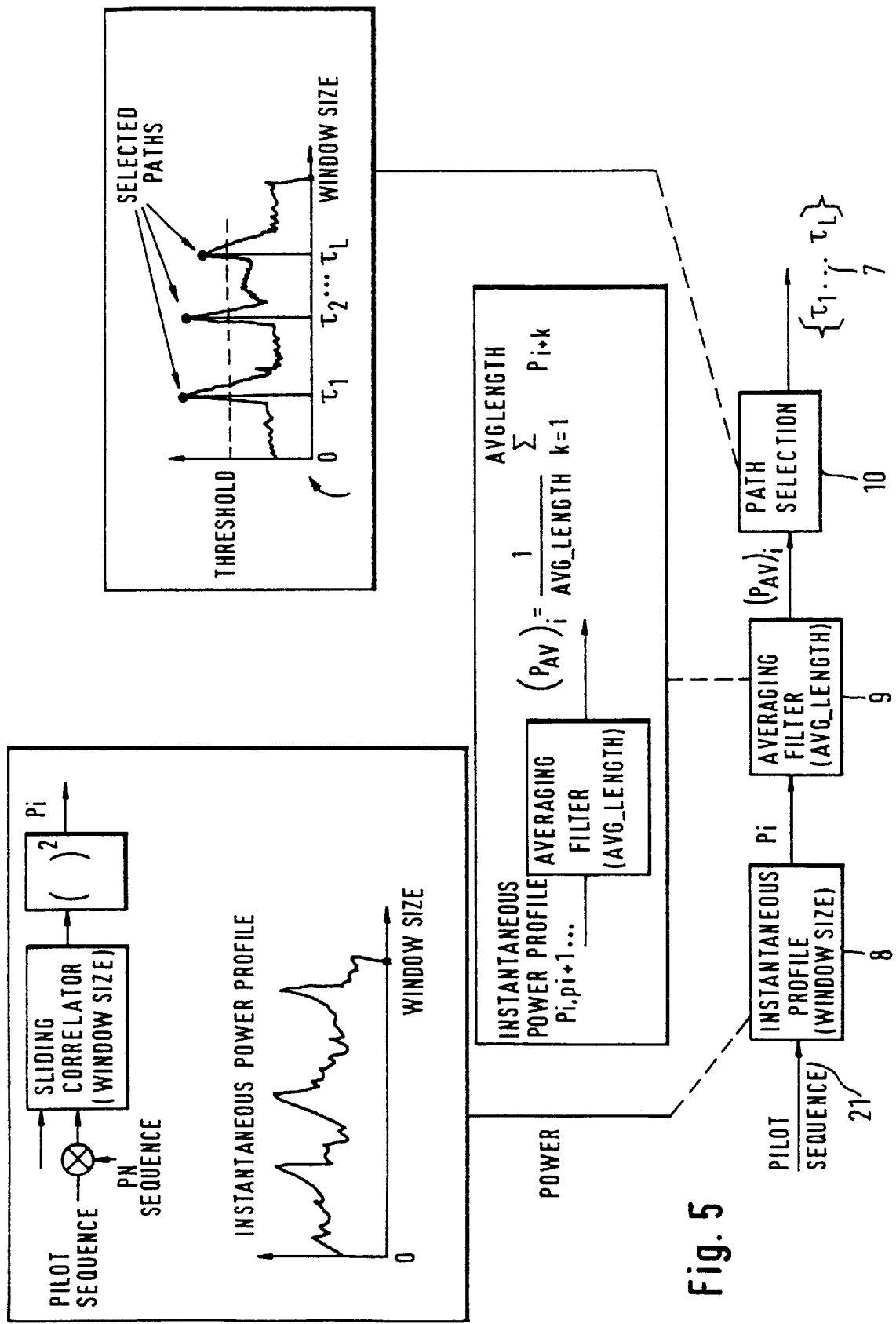
FIG. 5 Prior art path searcher

The path searcher needs a power profile prior to the path selection operation. The structure of a path searcher 3 is shown in FIG. 5 in more detail. The path searcher comprises an instantaneous profile analyzer 8 connected to an averaging filter 9 and a path selector 10. The instantaneous profile analyzer 8 extracts the energy distribution of the measured signal of the slot i of the pilot sequence 21. The result is an instantaneous power profile shown in FIG. 5 over a definite window size. To get a more reliable profile, the instantaneous channel profiles are computed by noncoherent averaging, which is performed on a slot-by-slot basis. The noncoherent averaging is performed over AVG_LENGTH slots by an averaging filter 9. The instantaneous profiles P1, p1+1 . . . are used. The last step is the path selector, which selects the paths whose power densities are above a predefined threshold. The result is a set of delays.

Figure 7:
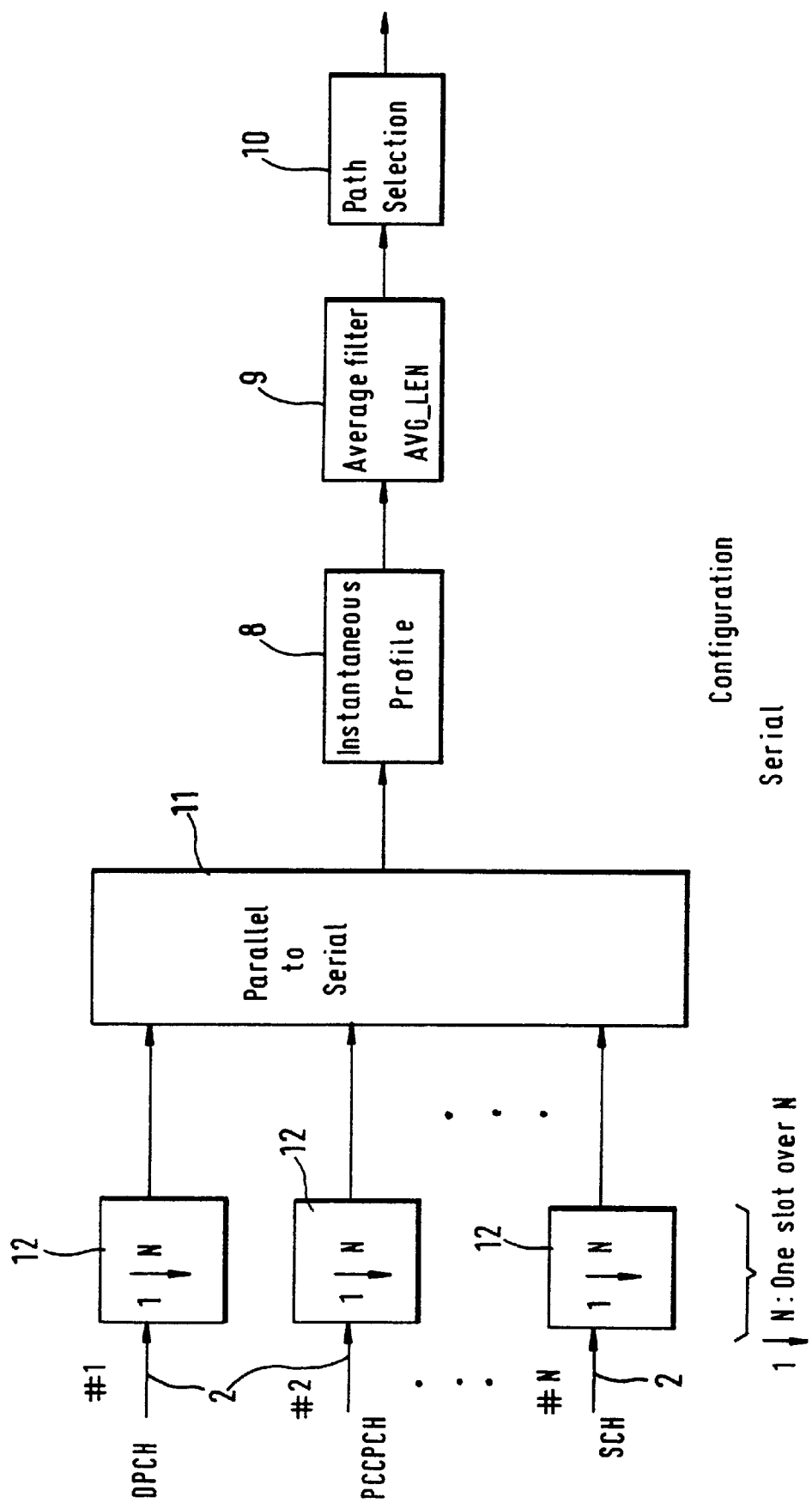
FIG. 7 Inventional serial receiver

To improve this path searcher performance the receiver is structured as shown in FIG. 7. FIG. 7 is a parallel configuration of a receiver. There is a plurality of input signals 2, for example the DPCH, the PCCPCH or the SCH. The pilot sequences of these channels are connected to a selection device 12 taking a probe of each pilot sequence for further analysis. These single probes are connected to a parallel-serial converter 11. The result is a data stream including channel information of more than one single pilot sequence. This data stream is analyzed in the way described above. The P/S converter 11 is connected to an instantaneous profile analyzer 8, an averaging filter 9, and a path selector 10.

Figure 6:
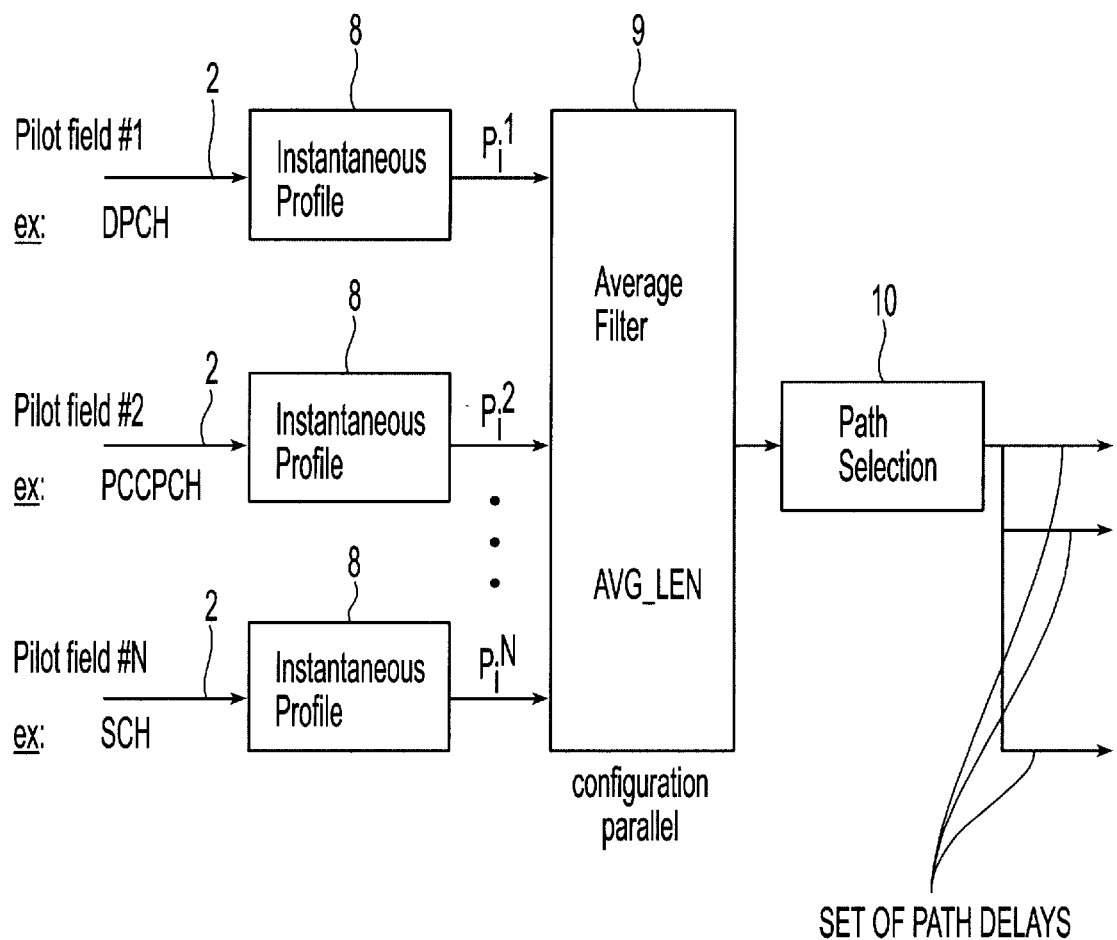
FIG. 6 Inventional parallel receiver

A second embodiment of the present invention is shown in FIG. 6. The incoming pilot sequences are input in parallel instantaneous profile analyzers 8. The analyzers 8 extract the instantaneous profiles $p^N_i$ for each pilot sequence received. Thereafter, the single power profiles are averaged in one averaging filter 9 and the result is selected by a path selector 10.

What is claimed is:

1. A rake receiver for receiving a plurality of radio-frequency channels containing pilot sequences, the rake receiver comprising:

a path searcher, comprising:
      at least two instantaneous profile analyzers configured to analyze the pilot sequences in order to generate power profiles of the plurality of radio-frequency channels;
      an averaging filter connected to the two instantaneous profile analyzers and configured to average the power profiles generated by the at least two instantaneous profile analyzers; and
      a path selector connected to the averaging filter for selecting a set of path delays of respective ones of the plurality of radio-frequency channels;
   a channel estimator connected to the path searcher; and
   a combiner connected to the channel estimator.

2. The rake receiver of claim 1, wherein the rake receiver is configured to receive pilot sequences of parallel-received channels so as to effect parallel extraction of data from the parallel-received channels.

3. The rake receiver of claim 1, wherein the rake receiver is configured to receive channels of at least one of fixed bit rates and varying bit rates.

4. A rake receiver, comprising:
   a path searcher, comprising:
      a selector to select at least two probes of pilot sequences;
      a parallel-to-serial converter connected to the selector;
      an instantaneous profile analyzer connected to the parallel-to-serial converter;
      an averaging filter connected to the instantaneous profile analyzer; and
      a path selector connected to the averaging filter for selecting a set of path delays;

a channel estimator connected to the path searcher; and a combiner connected to the channel estimator for selecting optimal channels paths.

5. The rake receiver of claim 4, wherein the rake receiver is configured to receive pilot sequences of parallel-received channels so as to effect parallel extraction of data from the parallel-received channels.

6. The rake receiver of claim 4, wherein the rake receiver is configured to receive channels of at least one of fixed bit rates and varying bit rates.

7. A method, comprising:

receiving a plurality of radio-frequency channels containing pilot sequences;

analyzing the pilot sequences by at least two instantaneous profile analyzers in order to generate power profiles of the plurality of radio-frequency channels;

averaging the power profiles by an averaging filter connected to the two instantaneous profile analyzers in order to generate respective averages; and based on the respective averages, selecting a set of path delays of respective ones of the plurality of radio-frequency channels by a path selector connected to the averaging filter.

* * * * *